United States Patent
Ning et al.

(10) Patent No.: US 12,332,817 B1
(45) Date of Patent: Jun. 17, 2025

(54) AUTOMOTIVE NETWORK SWITCH WITH ATTACK PROTECTION

(71) Applicant: Marvell Asia Pte Ltd, Singapore (SG)

(72) Inventors: Xiongzhi Ning, Karlsruhe (DE); Markus Althoff, Achern (DE); Biing Long Shu, Singapore (SG); Steffen Dolling, Ditzingen (DE); Sudong Yu, Singapore (SG); Thomas Kniplitsch, Insheim (DE)

(73) Assignee: Marvell Asia Pte Ltd, Singapore (SG)

( * ) Notice: Subject to any disclaimer, the term of this patent is extended or adjusted under 35 U.S.C. 154(b) by 256 days.

(21) Appl. No.: 18/165,362

(22) Filed: Feb. 7, 2023

Related U.S. Application Data

(60) Provisional application No. 63/307,914, filed on Feb. 8, 2022.

(51) Int. Cl.
*G06F 13/28* (2006.01)
*G06F 21/85* (2013.01)

(52) U.S. Cl.
CPC .............. *G06F 13/28* (2013.01); *G06F 21/85* (2013.01)

(58) Field of Classification Search
CPC .................................. G06F 13/28; G06F 21/85
See application file for complete search history.

(56) References Cited

U.S. PATENT DOCUMENTS

| | | | | |
|---|---|---|---|---|
| 5,742,604 A * | 4/1998 | Edsall | ................... | H04L 12/467 370/390 |
| 6,735,773 B1 * | 5/2004 | Trinh | ................... | H04L 12/5601 709/229 |
| 6,938,097 B1 * | 8/2005 | Vincent | ................... | H04L 47/50 709/224 |
| 8,103,809 B1 * | 1/2012 | Michels | ................... | G06F 13/28 710/22 |
| 8,880,632 B1 * | 11/2014 | Michels | ................... | H04L 47/10 709/212 |
| 8,880,771 B2 * | 11/2014 | Subramaniyan | ........ | G06F 21/85 710/316 |

(Continued)

OTHER PUBLICATIONS

Solomon, "PCI Express I/O Virtualization Explained," Presentation, SDC Storage Developer Conference, Santa Clara, LSI Corporation, pp. 1-34, year 2010.

(Continued)

*Primary Examiner* — J. Brant Murphy
(74) *Attorney, Agent, or Firm* — Meitar Patents Ltd.; Daniel Kligler

(57) ABSTRACT

A network switch, for use in an Ethernet network in a vehicle, includes multiple ports, a switch unit, a peripheral bus, multiple DMA engines and a mapping engine. The ports connect to the Ethernet network. The switch unit forwards packets s among the ports. The peripheral bus connects to a host that runs host applications. The DMA engines transfer packets from the host applications via the peripheral bus to the switch unit. The mapping engine constructs a mapping that maps between (i) bus functions of the peripheral bus that are assigned to the host applications, and (ii) respective ones of the DMA engines, and configures the switch unit, in accordance with the mapping, to permit forwarding of a packet sent from a host application only upon verifying that a DMA engine that transferred the packet is mapped to the bus function assigned to the host application.

18 Claims, 3 Drawing Sheets

(56) References Cited

U.S. PATENT DOCUMENTS

| | | | |
|---|---|---|---|
| 9,411,524 B2* | 8/2016 | O'Hare | G06F 21/85 |
| 11,558,428 B2 | 1/2023 | Mizrahi | |
| 2004/0008713 A1* | 1/2004 | Knight | G06F 13/28 |
| | | | 370/428 |
| 2008/0043732 A1* | 2/2008 | Desai | H04L 67/1097 |
| | | | 370/389 |
| 2008/0316922 A1* | 12/2008 | Riddle | H04L 47/10 |
| | | | 370/230 |
| 2012/0250682 A1* | 10/2012 | Vincent | H04L 45/74 |
| | | | 370/392 |
| 2012/0250686 A1* | 10/2012 | Vincent | H04L 12/4633 |
| | | | 370/392 |
| 2012/0324442 A1* | 12/2012 | Barde | G06F 9/45558 |
| | | | 718/1 |
| 2014/0108726 A1* | 4/2014 | Laurich | H04L 63/08 |
| | | | 711/114 |
| 2014/0122765 A1* | 5/2014 | Subramaniyan | G06F 21/85 |
| | | | 710/308 |
| 2014/0237156 A1* | 8/2014 | Regula | G06F 13/4022 |
| | | | 710/314 |
| 2015/0019789 A1* | 1/2015 | Subramaniyan | G06F 13/4022 |
| | | | 710/316 |
| 2016/0350151 A1* | 12/2016 | Zou | H04L 45/586 |
| 2018/0081854 A1* | 3/2018 | Joy | G06F 13/28 |
| 2020/0334184 A1* | 10/2020 | Suresh | G06F 13/128 |

OTHER PUBLICATIONS

Intel, "PCI-SIG Single Root I/O Virtualization," White Paper, pp. 1-4, year 2008.

IEEE Std. 802.3ch-2020, "IEEE Standard for Ethernet—Amendment 8: Physical Layer Specifications and Management Parameters for 2.5 GB/s, 5 GB/s, and 10 GB/s Automotive Electrical Ethernet," IEEE Computer Society, pp. 1-207, year 2020.

IEEE Std. 802.1Q-2005, "IEEE Standard for Local and Metropolitan Area Networks—Virtual Bridged Local Area Networks," IEEE Computer Society, pp. 1-303, year 2006.

* cited by examiner

AUTOMOTIVE NETWORK SWITCH WITH ATTACK PROTECTION

CROSS-REFERENCE TO RELATED APPLICATIONS

This application claims the benefit of U. S. Provisional Patent Application 63/307,914, filed Feb. 8, 2022, whose disclosure incorporated herein by reference.

FIELD OF THE DISCLOSURE

The present disclosure relates generally to network security, and particularly to methods and systems for securing network switches.

BACKGROUND

Packet networks are prone to attacks by various types of malware. In some scenarios, for example in automotive networks or in sensitive industrial networks, a successful attack may cause a serious safety hazard. As such, these types of networks are typically required to be highly secure.

The description above is presented as a general overview of related art in this field and should not be construed as an admission that any of the information it contains constitutes prior art against the present patent application.

SUMMARY

An embodiment that is described herein provides a network switch for use in an Ethernet network in a vehicle. The network switch includes multiple ports, a switch unit, a peripheral bus, multiple Direct Memory Access (DMA) engines, and a mapping engine. The ports are configured to connect to the Ethernet network. The switch unit is configured to forward packets among the ports. The peripheral bus is configured to connect to a host that runs host applications. The DMA engines are configured to transfer packets from the host applications via the peripheral bus to the switch unit. The mapping engine is configured to construct a mapping that maps between (i) bus functions of the peripheral bus that are assigned to the host applications, and (ii) respective ones of the DMA engines, and to configure the switch unit, in accordance with the mapping, to permit forwarding of a packet sent from a host application only upon verifying that a DMA engine that transferred the packet is mapped to the bus function assigned to the host application.

In some embodiment, the switch unit is further configured to forward the permitted packet. In a disclosed embodiment, the network switch further includes secure software that runs in the host and includes the mapping engine, the secure software being configured to assign the bus functions to the host applications and to map the assigned bus functions to the DMA engines. In an embodiment, the secure software is assigned a physical bus function (PF) of the peripheral bus.

In some embodiments, the DMA engines are configured to add respective tags to the packets transferred from the host applications to the switch unit, wherein a given tag added by a given DMA engine to a given packet specifies (i) an identifier of the given DMA engine and (ii) an identifier of the bus-function used by the given packet. In an embodiment, the switch unit includes a verification circuit configured to verify, using the tag of the packet, in accordance with the mapping, whether the DMA engine that transferred the packet is mapped to the bus function assigned to the host application.

In an embodiment, the verification circuit includes a rule engine configured with filtering rules in accordance with the mapping, including one or more rules that verify whether DMA the engines that transferred the packets are mapped respectively to the bus functions assigned to the host applications. In an example embodiment, in response to finding that the DMA engine that transferred the packet is mapped to the bus function assigned to the host application, the verification circuit is configured to remove the tag from the packet and to permit further processing of the packet by the switch unit.

In a disclosed embodiment, at least a given packet among the packets includes a Virtual Local Area Network (VLAN) tag, and the DMA engines are configured to add to the given packet a tag that specifies the identifier of the given DMA engine and the identifier of the bus-function, in addition to the VLAN tag.

There is additionally provided, in accordance with an embodiment that is described herein, a method for use in a network switch in an Ethernet network in a vehicle. The method includes transferring, using multiple Direct Memory Access (DMA) engines, packets from host applications via a peripheral bus to a switch unit of the network switch. A mapping, which maps between (i) bus functions of the peripheral bus that are assigned to the host applications, and (ii) respective ones of the DMA engines, is constructed. The switch unit is configured, in accordance with the mapping, to permit forwarding of a packet sent from a host application only upon verifying that a DMA engine that transferred the packet is mapped to the bus function assigned to the host application.

The present disclosure will be more fully understood from the following detailed description of the embodiments thereof, taken together with the drawings in which:

DETAILED DESCRIPTION OF EMBODIMENTS

Figure 1:
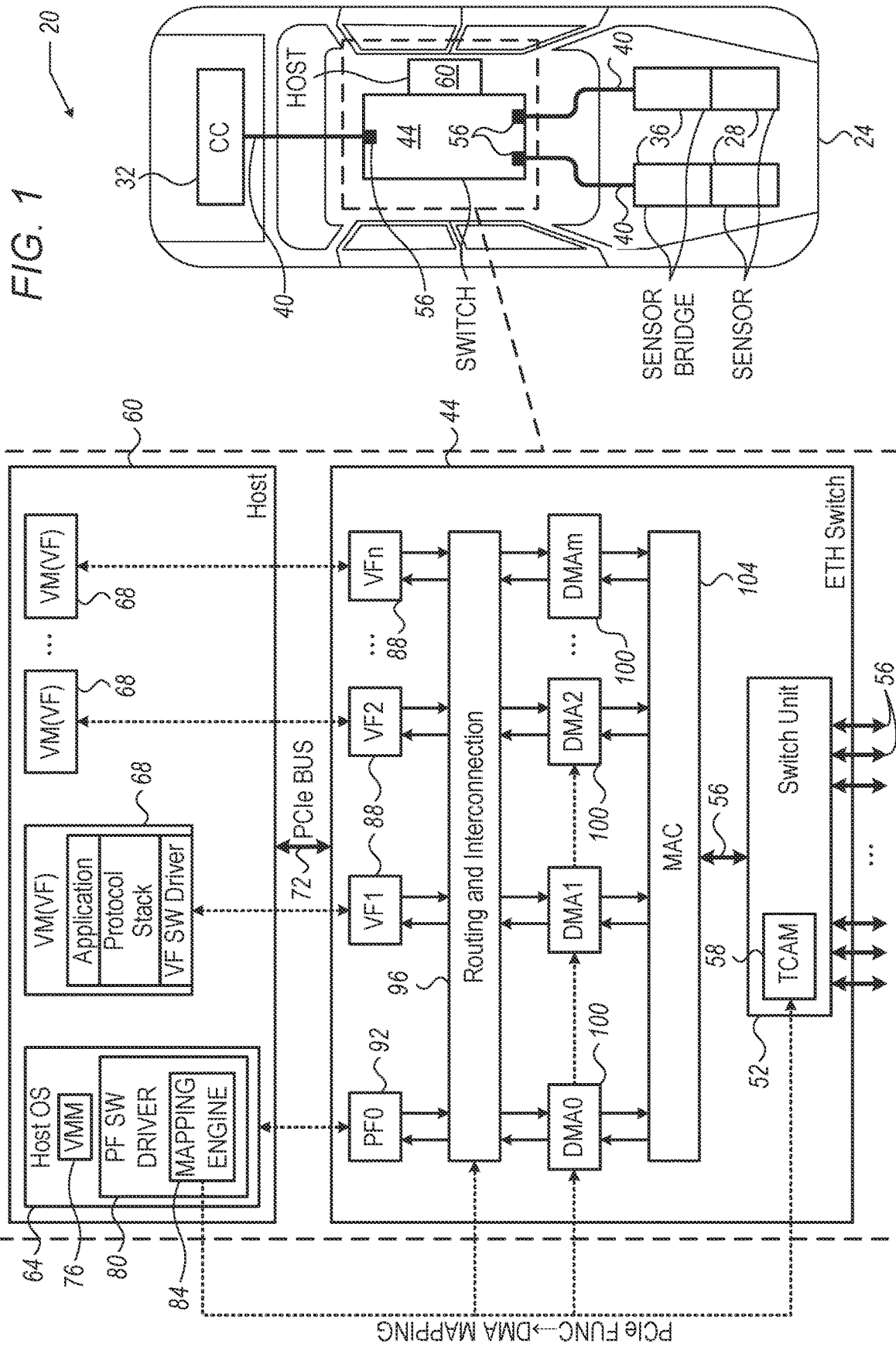
FIG. 1 is a block diagram that schematically illustrates an automotive computing and communication system including a host and an Ethernet switch, in accordance with an embodiment that is described herein.

Embodiments that are described herein provide improved techniques for securing a packet network from penetration of malicious traffic. The embodiments herein are described in the context of an Ethernet network in a vehicle, by way of example. The disclosed techniques, however, are not limited to any particular network type or protocol and can be used in any other network environment that requires a high degree of security, for example in industrial control networks. The terms "packets" and "frames" are used interchangeably throughout the present disclosure.

In some embodiments, a vehicle comprises an automotive Ethernet network that connects various sensors, Electronic Control Units (ECUs), computers and other system components. One of the system components connected to the network is a host that runs various host applications, such as infotainment applications and Advanced Driver Assistance (ADAS) applications, among others. In the present example the host applications are implemented as Virtual Machines (VMs). The host is connected to the network via a network switch. The host is connected to the switch by a peripheral bus, in the present example a Peripheral Component Interconnect express (PCIe) bus.

In an embodiment, the switch comprises multiple ports, a switch unit for forwarding packets among the ports, and a plurality of Direct Memory Access (DMA) engines for transferring packets between the switch unit and the host. The DMA engines access the host memory directly, over the PCIe bus. In some embodiments the switch unit connects to the DMA engines via a port that is designated for this purpose.

Among other functions, VMs running in the host may transmit and receive Ethernet packets to and from the network, via the switch. To enable multiple VMs to communicate with the switch over the PCIe bus, the host and the switch operate in accordance with Single-Root I/O Virtualization (SR-IOV). In such embodiments, the host runs secure software (e.g., as part of a hypervisor) that assigns each VM a respective PCIe function used for accessing the bus. Generally, the PCIe functions may comprise Physical Functions (PFs) and/or Virtual Functions (VFs). Typically, however, VMs are assigned VFs, and the hypervisor is assigned a PF. When sending and receiving traffic via the PCIe bus, the traffic of each VM indicates the VM's assigned PCIe function.

In a practical implementation of such a system, some of the VMs may not be trusted. For example, the host may provide an open Application Programming Interface (API) for hosting guest VMs provided by third parties. A system of this sort is described, for example, in U.S. Pat. No. 11,558,428, entitled "Automotive Gateway Providing Secure Open Platform for Guest Applications," whose disclosure is incorporated herein by reference. In scenarios of this kind, and in other use-cases, it is highly important to protect the network from hostile traffic that may originate from untrusted applications.

In some embodiments described herein, the host and the switch identify and mitigate suspicious packets using the following scheme:

- The host specifies a mapping between each legitimately-assigned PCIe function (which is in turn assigned to a legitimate VM) and a respective one of the DMA engines of the switch. The host configures the [PCIe function, DMA engine] mapping in the DMA engines and in the switch unit. These actions, as well as the initial assignment of PCIe functions to VMs, are performed from within a secure, trusted environment in the host.
- The DMA engines transfer packets from the host to the switch unit in accordance with the [PCIe function, DMA engine] mapping. In other words, a packet associated with a certain PCIe function will be transferred by the DMA engine mapped to that PCIe function.
- Each DMA engine adds tags, referred to as "hardware tags", to the packets it transfers. The hardware tag of a packet comprises (i) an identifier of the PCIe function associated with the packet and (ii) an identifier of the DMA engine that transferred the packet.
- Upon receiving a packet for forwarding, the switch unit verifies that the hardware tag of the packet complies with the [PCIe function, DMA engine] mapping, i.e., that the DMA engine that transferred the packet is indeed mapped to the PCIe function associated with the packet.
- A packet whose hardware tag does not match the [PCIe function, DMA engine] mapping (i.e., a packet transferred by a DMA engine that is not mapped to the PCIe function of the packet) is considered suspicious or hostile. The switch unit may discard such packets and/or initiate other suitable responsive actions.

Various alternative embodiments and implementation examples of the above scheme are described herein. For example, the switch unit may comprise a Ternary Content-Addressable Memory (TCAM) that stores rules governing the operation of the switch. In some embodiments, the host programs the TCAM with filtering rules that check the hardware tags of packets and make pass/drop decisions according to the [PCIe function, DMA engine] mapping.

The disclosed security scheme is highly effective in protecting the network from malicious packets originating from untrusted VMs. When implemented in hardware, the disclosed technique incurs little or no overhead in performance, e.g., in traffic bandwidth or latency. The disclosed technique also does not require software changes in the host or in the switch, FIG. 1 is a block diagram that schematically illustrates an automotive computing and communication system 20, in accordance with an embodiment that is described herein. System 20 is installed in a vehicle 24 and comprises various system components that communicate over an Ethernet network. The system components may comprise various sensors 28, sensor bridges 36, a central computer (CC) 32, various Electronic Control Units (ECUs—not seen in the figure), etc.

One of the system components communicating over the Ethernet network is a host 60. Host 60 is configured to run various host applications such as infotainment applications and Advanced Driver Assistance (ADAS) applications, as well as third-party applications. Host 60 may comprise any suitable type of processor or multiple processors, e.g., one or more CPUs and/or GPUs. Techniques for protecting system 20 from malicious communication traffic, which may originate from applications running in host 60, are described in detail herein.

The Ethernet network of system 20 comprises multiple network links 40 and one or more Ethernet switches 44. Switch 44 comprises multiple ports 56 for connecting to network links 40. Links 40 may comprise, for example, twisted-pair cables. The various system components and switch 44 may communicate over network links 40 at any suitable bit rate. Example bit rates are 2.5 Gb/s, 5 Gb/s or 10 Gb/s, in accordance with the IEEE 802.3ch-2020 standard.

An inset on the left-hand side of FIG. 1 illustrates an example implementation of switch 44 and host 60, in an embodiment. Switch 44, seen at the bottom of the inset, is implemented as a System-on-Chip (SoC). Host 60 is seen at the top of the inset. Host 60 and switch 44 communicate with one another using a PCIe bus 72.

Switch 44 comprises multiple Ethernet ports 56 and a switch unit 52 that forwards packets from one port to another. One of ports 56, seen at the top of switch unit 52, is designated for communication with host 60. Switch unit 52 comprises a TCAM 58, in an embodiment, which stores a set of rules that govern the handling of packets by switch unit 52. Some of the rules comprise forwarding rules, which specify the ports to which packets are to be forwarded depending on parameters such as header-field values. Other rules, sometimes referred to as access-control rules or filtering rules, specify criteria for deciding whether to discard (i.e., drop) a packet or to allow the packet to be processed by the switch unit. Switch unit 52 typically comprises a suitable rule-engine that applies the rules stored in TCAM 58.

Host 60 runs a host Operating System (OS) 64 and one or more host applications. In the present example the host applications run in respective Virtual Machines (VMs) 68. Among other components, host OS 64 runs a Virtual-Machine Manager (VMM) 76 that manages VMs 68. Both host OS 64 and VMs 68 access PCIe bus 72. In an embodiment, the communication between host 60 and switch 44 is carried out over a single physical PCIe link, and the resources of the PCIe link are assigned to host OS 64 and to VMs 68 in accordance with SR-IOV.

In the present example, host OS 64 is assigned a Physical Function (PF) denoted PF0, and VMs 68 are assigned respective Functions Virtual (VFs) denoted VF1 . . . . VFn. PF0 is designated as a hypervisor. To access PCIe bus 72, host OS 64 runs a PF software (PF SW) driver 80, and each VM runs a respective VF software (VF SW) driver, Each VM also runs the appropriate host application, and a communication protocol stack.

PF SW driver 80 in host OS 64 is responsible for assigning PCIe bus resources, and for global hardware configurations relating to PCIe bus 72. In an embodiment, PF SW driver 80 operates in a secure, trusted environment. Assignments and configurations made by PE SW driver 80 cannot be changed by other system components, e.g., by other PFs or VFs. PF SW driver 80 comprises a engine 84, whose role in the disclosed security techniques will be explained in detail below.

In some embodiments, switch 44 further comprises circuitry for transferring packets between host 60 and switch unit 52. In the present example this circuitry comprises a PF0 interface 92 and multiple VF interfaces 88 for interfacing with PCIe bus 72, a routing and interconnection module 96, a plurality of Direct Memory Access (DMA) engines 100 denoted DMA1 . . . . DMAm, and a Medium Access Control (MAC) module 104. MAC module 104 applies MAC layer processing to the packets in accordance with the applicable IEEE 802.11 standards. In an example embodiment MAC module 104 comprises two MAC processors connected back-to-back, one MAC processor associated with DMA engines 100, and the other MAC processor associated with switch unit 52.

DMA engines 100 operate in parallel. To transfer a packet from host 60 to switch unit 52, one of DMA engines 100 reads the packet data directly from the memory of host 60 (over PCIe bus 72) and sends the read packet data to switch unit 52. To transfer a packet from switch unit 52 to host 60, one of DMA engines 100 receives the packet data from switch unit 52 and writes the packet data directly (over PCIe bus 72) to the memory of host 60.

Generally, the number of VFs (n) need not match the number of DMA engines (m). In one example implementation, the number of DMA engines is twenty and the number of VFs is between fourteen, although any other suitable numbers can be used.

The configuration of system 20 shown in FIG. 1, and the configurations of switch 44 and host 60, are example configurations that are depicted solely for the sake of clarity. In alternative embodiments, any other suitable configurations can be used. The different elements of switch 44 and host 60 described herein may be implemented using dedicated hardware or firmware, such as using hard-wired or programmable logic, e.g., in an Application-Specific Integrated Circuit (ASIC) or Field-Programmable Gate Array (FPGA). Additionally, or alternatively, some functions of switch 44 and host 60 may be implemented in software and/or using a combination of hardware and software elements. Elements that are not mandatory for understanding of the disclosed techniques have been omitted from the figure for the sake of clarity.

In some embodiments, some functions of switch 44 and host 60 may be implemented in one or more programmable processors, e. g., one 0 more microcontrollers, Central Processing Units (CPUs); Graphics Processing Units (GPUs) and/or Digital Signal Processors (DSPs), which are programmed in software to carry out the functions described herein. The software may be downloaded to any of the processors in electronic form, over a network, for example, or it may, alternatively or additionally, be provided and/or stored on non-transitory tangible media, such as magnetic, optical, or electronic memory.

As noted above, in some cases VMs 68 cannot be trusted a-priori, and it is important to prevent a rogue VM 68 or other rogue software from injecting illegitimate packets into the Ethernet network via switch 44. Rogue software would typically send packets to the network using a PCIe function (PF or VF) that is not known to PF SW driver 80 of host OS 64. In some embodiments, host OS 64 and switch 44 protect the network from such illegitimate packets by (i) specifying a strict mapping between PCIe bus functions (PFs, VFs) and DMA engines 100, and (ii) discarding packets that violate the mapping.

In some embodiments, PF SW driver 80 assigns each legitimate VM respective PCIe function. The assignment may be performed, for example, as part of an initialization process of host 60 and/or when provisioning a new VM 68. PF SW driver 80 also specifies mapping between each legitimately-assigned PCIe function (which is in turn assigned to a legitimate VM 68) and a respective one of DMA engines 100. This mapping is referred to herein as a [PCIe function, DMA engine] mapping, or simply "mapping". Typically, each PCIe function has a unique identifier referred to as FUNC_ID, each DMA engine 100 has a unique identifier referred to as DMA_ID, and the mapping is defined as a plurality of pairs of the form [FUNC_ID, DMA_ID].

PF SW driver 80 configures the [PCIe function, DMA engine] mapping in routing and interconnection module 96 and in DMA engines 100. PF SW driver 80 also programs TCAM 58 with filtering rules that enforce the mapping, i.e., allow processing of packets that meet the mapping and drop packets that violate the mapping. Since PF SW driver 80 runs in a secure environment using PF0, the assignments, the mapping and the configuration of TCAM 58 cannot be changed by rogue software or by any other system component.

During normal operation of system 20, DMA engines 100 transfer packets from VMs 68 to switch unit 52 in accordance with the [PCIe function, DMA engine] mapping. Thus, a packet associated with a certain PCIe function (e.g., VF) will be transferred by the DMA engine 100 mapped to that PCIe function. In some embodiments, each DMA engine 100 adds tags, referred to as "hardware tags", to the packets it transfers from VMs 68 to switch unit 52. The hardware tag of a packet comprises (i) an identifier of the PCIe function (e. g., VF) associated with the VM 68 that sent the packet and (ii) an identifier of the DMA engine 100 that transferred the packet.

When such a packet arrives at switch unit 52 for forwarding to the network, switch unit 52 checks whether the hardware tag of the packet complies with the [PCIe function, DMA engine] mapping. In other words, switch unit 52 uses TCAM 58 to verify whether the DMA engine 100 that transferred the packet (the DMA engine whose DMA_ID appears in the hardware tag) is indeed mapped to the PCIe function associated with the packet (the PCIe function whose FUNC_ID appears in the hardware tag).

In an example implementation, TCAM 58 is programmed (by PF SW driver 80) with filtering rules that decide whether to pass or drop an incoming packet depending on the DMA engine identifier and the PCIe function identifier in the packet's hardware tag. With these filtering rules in-place, the rule-engine coupled to TCAM 58 will drop a packet, if the packet was handled by a DMA engine that was not mapped to the PCIe function associated with the packet. Such packets are therefore prevented from reaching the Ethernet network.

Figure 2:
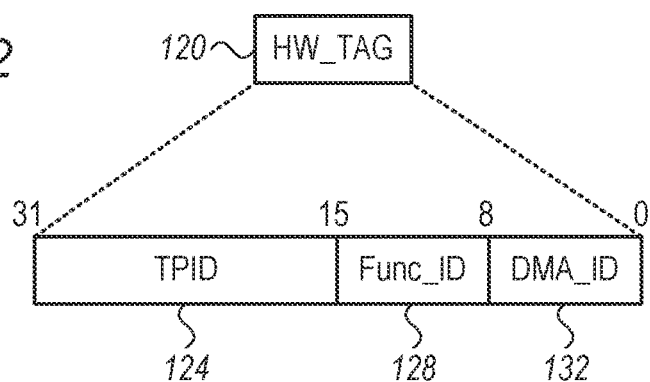
FIG. 2 is a diagram illustrating a hardware tag added to an Ethernet packet by a Direct Memory Access (DMA) engine in the Ethernet switch of FIG. 1, in accordance with an embodiment that is described herein.

FIG. 2 is a diagram illustrating a hardware tag (HW TAG) 120 added to an Ethernet packet by a DMA engine 100 in Ethernet switch 44 of system 20, in accordance with an embodiment that is described herein. In the present embodiment, hardware tag 120 has a total size of four bytes, and comprises the following fields:

A Tag Protocol Identifier (TPID) 124: A 16-bit field set to 0x8100, thereby identifying the Ethernet packet (frame) as an IEEE 802.11Q-tagged frame.
A FUNC_ID 128: An 8-bit field that specifies the PCIe function associated with the packet.
A DMA_ID 132: An 8-bit field that specifies the DMA engine that transferred the packet.

The hardware tag format depicted in FIG. 2 is chosen solely by way of example. In alternative embodiments, HW-TAG 120 may have any other suitable format. Note that the disclosed mechanism of adding hardware tag 120 to an Ethernet packet is also applicable to an Ethernet packet that already comprises a VLAN tag. In such a case, the packet will be double tagged. Handling of double-tagged frames is specified in the IEEE 802.1Q standard.

Figure 3A:
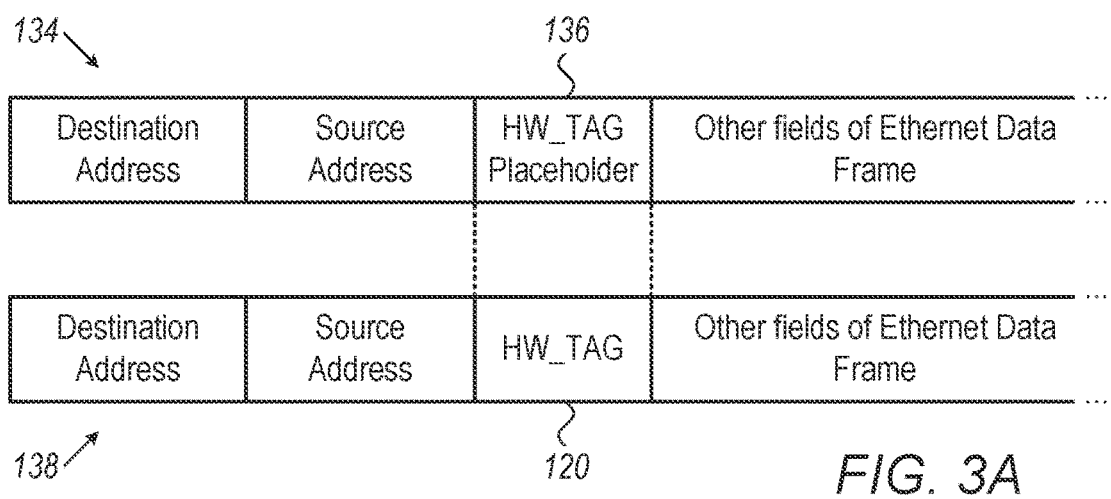
FIGS. 3A and 3B are diagrams illustrating two alternative processes of adding a hardware tag to an Ethernet packet, in accordance with embodiments that are described herein.
Figure 3B:
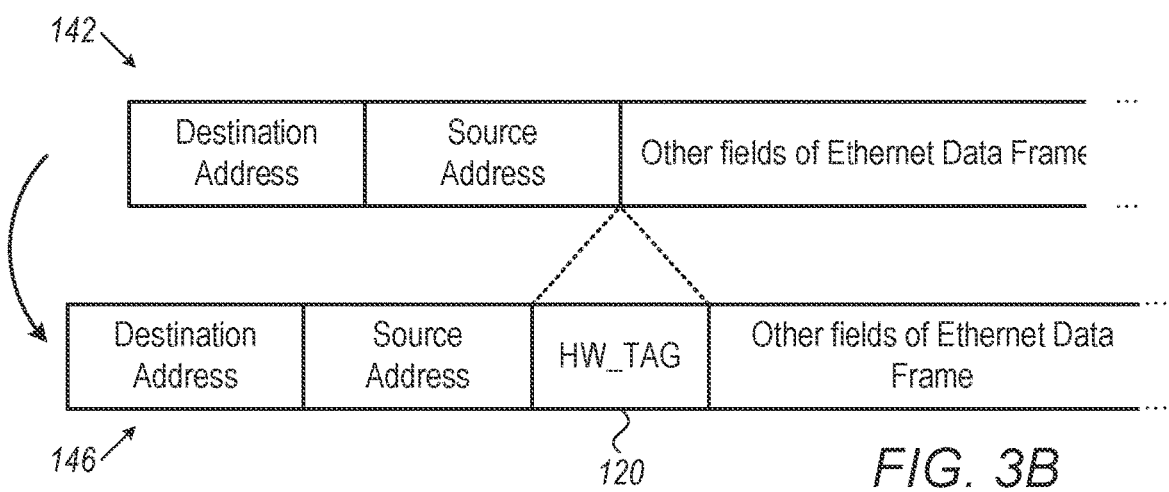

FIG. 3A is a diagram illustrating a process of adding hardware tag 120 to an Ethernet packet (frame), in accordance with an embodiment that is described herein. In this example, the protocol stack in host 60 generates an Ethernet packet 134 having a four-byte placeholder field 136 for the hardware tag. The bit or byte values in placeholder field 136 can be set to any arbitrary values, e.g., to random values or to all-zeros. Upon receiving packet 134, DMA engine 100 replaces placeholder field 136 with HW-TAG 120 having the actual desired values of TPID, FUNC_ID DMA_ID, thus and producing a tagged packet 138. The tagged packet is sent from DMA engine 100 to switch unit 52. The scheme of FIG. 3A simplifies the operation of DMA engines 100, which are only required to write the suitable field values of the hardware tags into existing locations in the packet, FIG. 3B is a diagram illustrating an alternative and enhanced process of adding hardware tag 120 to an Ethernet packet (frame) 142, in accordance with another embodiment that is described herein. In this embodiment, the protocol stack in host 60 generates a conventional Ethernet packet 142 having no placeholder hardware tag. Upon receiving packet 142, DMA engine 100 inserts hardware tag 120 into the packet, thus producing a tagged packet 146. DMA engine 100 then sends the tagged packet to switch unit 52. In an embodiment, in the scheme of FIG. 3B the packets sent from host 60 are conventional Ethernet packets having no hardware tags 120. The scheme of FIG. 3B can be implemented purely in hardware in DMA engines 100, without requiring any changes in the host-side protocol stack. Since no host software involvement is required, this scheme incurs little or no extra latency.

The schemes depicted in FIGS. 3A and 3B are chosen solely by way of example. In alternative embodiments, hardware tags 120 can be added to packet in any other suitable way.

Figure 4:
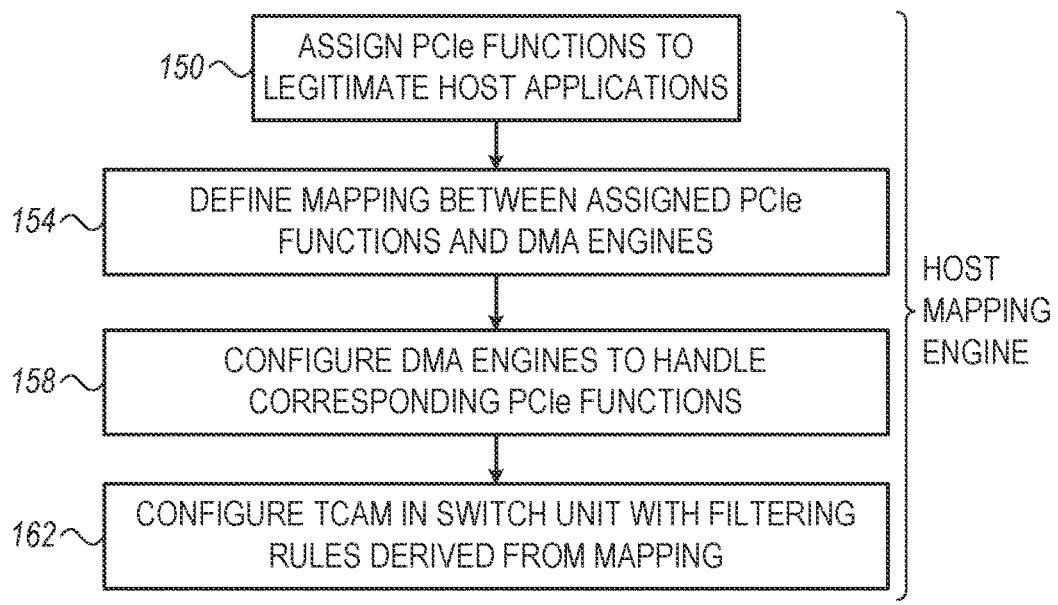
FIG. 4 is a flow chart that schematically illustrates a method for configuring the Ethernet switch of FIG. 1 to protect against malicious traffic, in accordance with an embodiment that is described herein.

FIG. 4 is a flow chart that schematically illustrates a method for configuring Ethernet switch 44 of system 20 to protect against malicious traffic, in accordance with an embodiment that is described herein. The method begins with mapping engine 84 in host OS 64 assigning a respective PCIe function to each legitimate host application (in the present example to each legitimate VM 68), at an assignment operation 150.

At a mapping operation 154, mapping engine 84 defines a [PCIe function, DMA engine] mapping, i.e., a mapping that maps each of the assigned PCIe functions to a respective one of DMA engines 100. At 3 DMA configuration operation 158, mapping engine 84 configures the DMA engines to handle the corresponding PCIe functions.

At a TCAM configuration operation 162, mapping engine 84 programs TCAM 58 with filtering rules that enforce the [PCIe function, DMA engine] mapping. In an embodiment, the filtering rules allow switch unit 52 to process (e.g., forward) packets that comply with the mapping, and discard packets that violate the mapping. Additionally or alternatively, the filtering rules may specify other responsive actions for packets that violate the [PCIe function, DMA engine] mapping. A responsive action may involve, for example, mirroring a violating packet to a test port, issuing an alert by incrementing statistics counters, and/or any other suitable action.

Figure 5:
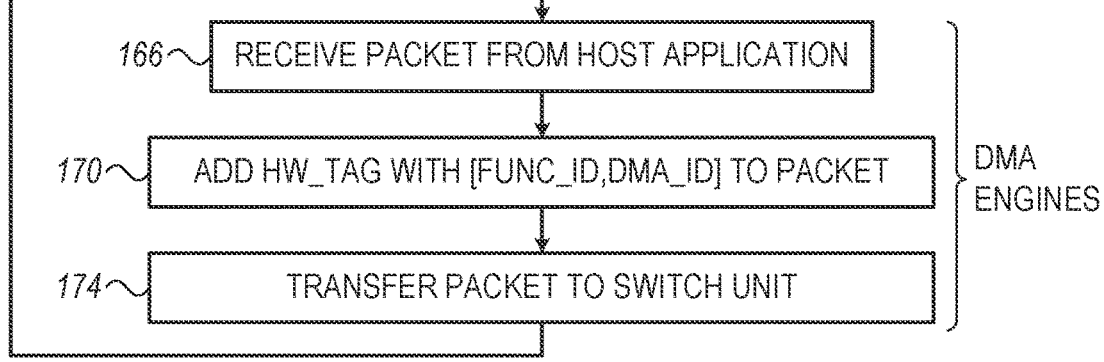
FIG. 5 is a flow chart that schematically illustrates a method for transferring packets from host applications to a switch unit using DMA engines in the Ethernet switch of FIG. 1, in accordance with an embodiment that is described herein.

FIG. 5 is a flow that schematically chart illustrates a method for transferring packets from host applications (in the present example VMs 68) to switch unit 52 using DMA engines 100, in accordance with an embodiment that is described herein. The method begins with a certain DMA engine 100 receiving a packet that originates from a certain VM 68, at a packet reception operation 166.

At a tagging operation 170, DMA engine 100 adds a hardware tag 120 to the packet. The hardware tag comprises (i) the FUNC_ID of the PCIe function associated with the VM 68 that generated the packet, and (ii) the DMA_ID of the DMA engine 100 that handles the packet. At a transfer operation 174, DMA engine 100 transfers the tagged packet to switch unit 52.

Figure 6:
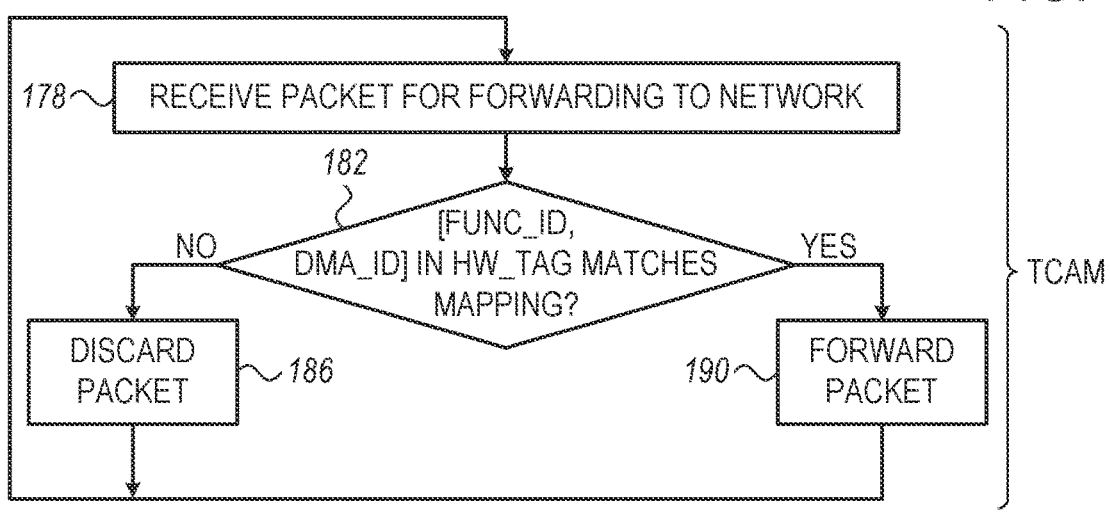
FIG. 6 is a flow chart that schematically illustrates a method for filtering packets in the switch unit of the Ethernet switch of FIG. 1, in accordance with an embodiment that is described herein.

FIG. 6 is a flow chart that schematically illustrates a method for filtering packets in switch unit 52 of Ethernet switch 44 of system 20, in accordance with an embodiment that is described herein. The method begins with switch unit 52 receiving a tagged packet for forwarding, at a packet ingress operation 178.

At a rule checking operation 182, a rule engine in switch unit 52 checks, using the filtering rules stored in TCAM 58, whether the FUNC_ID and the DMA_ID values in hardware tag 120 of the packet are indeed mapped to one another in the [PCIe function, DMA engine] mapping.

If the FUNC_ID and the DMA_ID values are mapped to one another, switch unit 52 permits further processing of the packet, e.g., forwarding of the packet to an appropriate egress port, at a forwarding operation 190. Switch unit 52 typically removes the hardware tag from the packet before forwarding.

Otherwise, i.e., if the FUNC_ID and the DMA_ID values are not mapped to one another, switch unit 52 discards the packet, at a discarding operation 186. As noted above, switch unit 52 may also initiate other suitable responsive actions.

It is noted that the embodiments described above are cited by way of example, and that the present invention is not limited to what has been particularly shown and described hereinabove. Rather, the scope of the present invention includes both combinations and sub-combinations of the various features described hereinabove, as well as variations and modifications thereof which would occur to persons skilled in the art upon reading the foregoing description and which are not disclosed in the prior art. Documents incorporated by reference in the present patent application are to be considered an integral part of the application except that to the extent any terms are defined in these incorporated documents in a manner that conflicts with the definitions made explicitly or implicitly in the present specification, only the definitions in the present specification should be considered,

The invention claimed is:

1. A network switch for use in an Ethernet network in a vehicle, the network switch comprising:
   multiple ports, configured to connect to the Ethernet network;
   a switch unit, configured to forward packets among the ports;
   a peripheral bus, configured to connect to a host that runs host applications, the host applications being assigned respective bus functions of the peripheral bus;
   multiple Direct Memory Access (DMA) engines configured to:
      transfer packets from the host applications via the peripheral bus to the switch unit, and
      add, to the packets, respective tags that associate (i) the DMA engines that transfer the packets with (ii) the bus functions assigned to the host applications that sent the packets; and
   a mapping engine, configured to:
      construct a mapping that maps between the bus functions and respective ones of the DMA engines; and
      configure the switch unit, in accordance with the mapping, to permit forwarding of a packet sent from a host application only upon verifying, using the respective tag added to the packet by a given DMA engine that transferred the packet, that the given DMA engine that transferred the packet is mapped to a bus function assigned to a host application that sent the packet.

2. The network switch according to claim 1, wherein the switch unit is further configured to forward the permitted packet.

3. The network switch according to claim 1, further comprising secure software that runs in the host and comprises the mapping engine, the secure software being configured to assign the bus functions to the host applications and to map the assigned bus functions to the DMA engines.

4. The network switch according to claim 3, wherein the secure software is assigned a physical bus function (PF) of the peripheral bus.

5. The network switch according to claim 1, wherein a given tag added by a given DMA engine to a given packet specifies (i) an identifier of the given DMA engine and (ii) an identifier of the bus-function used by the given packet.

6. The network switch according to claim 5, wherein the switch unit comprises a verification circuit configured to verify, using the tag of the packet, in accordance with the mapping, whether the DMA engine that transferred the packet is mapped to the bus function assigned to the host application.

7. The network switch according to claim 1, wherein the switch unit comprises a rule engine configured with filtering rules in accordance with the mapping, including one or more rules that verify whether the DMA engines that transferred the packets are mapped respectively to the bus functions assigned to the host applications.

8. The network switch according to claim 1, wherein, in response to finding that the DMA engine that transferred the packet is mapped to the bus function assigned to the host application, the switch unit is configured to remove the tag from the packet and to permit further processing of the packet by the switch unit.

9. The network switch according to claim 1, wherein at least a given packet among the packets comprises a Virtual Local Area Network (VLAN) tag, and wherein the DMA engines are configured to add to the given packet the tag that specifies the identifier of the given DMA engine and the identifier of the bus-function, in addition to the VLAN tag.

10. A method for use in a network switch in an Ethernet network in a vehicle, the method comprising:
   transferring, using multiple Direct Memory Access (DMA) engines, packets from host applications via peripheral bus to a switch unit of the network switch, the host applications being assigned respective bus functions of the peripheral bus, wherein the transferring comprises adding, to the packets, respective tags that associate the DMA engines that transfer the packets with the bus functions assigned to the host applications that sent the packets;
   constructing a mapping that maps between the bus functions and respective ones of the DMA engines; and
   configuring the switch unit, in accordance with the mapping, to permit forwarding of a packet sent from a host application only upon verifying, using the respective tag added to the packet by a given DMA engine that transferred the packet, that the given DMA engine that transferred the packet is mapped to a bus function assigned to a host application that sent the packet.

11. The method according to claim 10, further comprising forwarding the permitted packet by the switch unit.

12. The method according to claim 10, further comprising assigning the bus functions to the host applications, and mapping the assigned bus functions to the DMA engines, using secure software that runs in the host.

13. The method according to claim 12, further comprising assigning the secure software a physical bus function (PF) of the peripheral bus.

14. The method according to claim 10, wherein a given tag added by a given DMA engine to a given packet specifies (i) an identifier of the given DMA engine and (ii) an identifier of the bus-function used by the given packet.

15. The method according to claim 10, further comprising verifying by the switch unit, using the tag of the packet, in accordance with the mapping, whether the DMA engine that transferred the packet is mapped to the bus function assigned to the host application.

16. The method according to claim 15, wherein verifying whether the DMA engine is mapped to the bus function comprises applying a rule engine configured with filtering rules in accordance with the mapping, including one or more rules that verify whether the DMA engines that transferred the packets are mapped respectively to the bus functions assigned to the host applications.

17. The method according to claim 15, further comprising, by the switch unit, in response to finding that the DMA engine that transferred the packet is mapped to the bus function assigned to the host application, removing the tag from the packet and permitting further processing of the packet.

18. The method according to claim 10, wherein at least a given packet among the packets comprises a Virtual Local Area Network (VLAN) tag, and wherein adding the tags comprises adding to the given packet the tag that specifies the identifier of the given DMA engine and the identifier of the bus-function, in addition to the VLAN tag.

* * * * *